United States Patent
Xie et al.

(10) Patent No.: US 9,754,923 B1
(45) Date of Patent: Sep. 5, 2017

(54) POWER GATE PLACEMENT TECHNIQUES IN THREE-DIMENSIONAL (3D) INTEGRATED CIRCUITS (ICS) (3DICS)

(71) Applicant: QUALCOMM Incorporated, San Diego, CA (US)

(72) Inventors: Jing Xie, San Diego, CA (US); Kambiz Samadi, San Diego, CA (US); Pratyush Kamal, San Diego, CA (US); Yang Du, Carlsbad, CA (US); Javid Jaffari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/149,646

(22) Filed: May 9, 2016

(51) Int. Cl.
*H01L 25/065* (2006.01)
*H01L 23/522* (2006.01)
(Continued)

(52) U.S. Cl.
CPC ...... *H01L 25/0657* (2013.01); *G06F 17/5072* (2013.01); *H01L 23/481* (2013.01); *H01L 23/528* (2013.01); *H01L 23/5226* (2013.01); *H01L 24/13* (2013.01); *H01L 27/0688* (2013.01); *H01L 2224/13014* (2013.01);
(Continued)

(58) Field of Classification Search
CPC ............. H01L 25/0657; H01L 23/5226; H01L 23/528; H01L 24/13; H01L 23/481; H01L 27/0688; G06F 17/5072
See application file for complete search history.

(56) References Cited

U.S. PATENT DOCUMENTS 7,509,613 B2    3/2009 Frenkil
2009/0085217 A1*  4/2009 Knickerbocker ..... H01L 21/486
                                                 257/774
(Continued)

OTHER PUBLICATIONS

Panth, Shreepad et al., "High-Density Integration of Functional Modules Using Monolithic 3D-IC Technology," 2013 18th Asia and South Pacific Design Automation Conference (ASP-DAC), Jan. 22-25, 2013, Yokohama, IEEE, pp. 681-686.
(Continued)

*Primary Examiner* — Jarrett Stark
(74) *Attorney, Agent, or Firm* — Withrow & Terranova, PLLC (57) ABSTRACT

Power gate placement techniques in three-dimensional (3D) integrated circuits (ICs) (3DICs) are disclosed. Exemplary aspects of the present disclosure contemplate consolidating power gating circuits or cells into a single tier within a 3DIC. Still further, the power gating circuits are consolidated in a tier closest to a voltage source. This closest tier may include a backside metal layer that allows a distance between the voltage source and the power gating circuits to be minimized. By minimizing the distance between the voltage source and the power gating circuits, power loss from routing elements therebetween is minimized. Further, by consolidating the power gating circuits in a single tier, routing distances between the power gating circuits and downstream elements may be minimized and power loss from those routing elements are minimized. Other advantages are likewise realized by placement of the power gating circuits according to exemplary aspects of the present disclosure.

16 Claims, 7 Drawing Sheets

(51) Int. Cl.
    *H01L 23/528* (2006.01)
    *H01L 23/00* (2006.01)
    *G06F 17/50* (2006.01)
    *H01L 23/48* (2006.01)
    *H01L 27/06* (2006.01)

(52) U.S. Cl.
    CPC ............... *H01L 2224/13016* (2013.01); *H01L 2224/13023* (2013.01); *H01L 2224/13025* (2013.01); *H01L 2225/06541* (2013.01); *H01L 2924/13091* (2013.01); *H01L 2924/141* (2013.01); *H01L 2924/1431* (2013.01); *H01L 2924/1434* (2013.01); *H01L 2924/14335* (2013.01)

(56) References Cited

U.S. PATENT DOCUMENTS

| | | | |
|---|---|---|---|
| 2012/0129301 A1* | 5/2012 | Or-Bach | G11C 8/16 438/129 |
| 2014/0061884 A1 | 3/2014 | Carpenter et al. | |
| 2014/0225218 A1 | 8/2014 | Du | |
| 2015/0022262 A1 | 1/2015 | Du et al. | |
| 2015/0084680 A1 | 3/2015 | Cheng et al. | |
| 2015/0091633 A1* | 4/2015 | Tsuchiya | G06F 17/5072 327/365 |
| 2015/0162448 A1 | 6/2015 | Raghavan et al. | |
| 2015/0168972 A1 | 6/2015 | Mathiyalagan et al. | |
| 2015/0228584 A1* | 8/2015 | Huang | H01L 23/5384 257/774 |
| 2015/0348962 A1* | 12/2015 | Chao | H01L 23/5283 257/207 |

OTHER PUBLICATIONS

International Search Report and Written Opinion for PCT/US2017/025286, dated Jul. 6, 2017, 15 pages.

\* cited by examiner

POWER GATE PLACEMENT TECHNIQUES IN THREE-DIMENSIONAL (3D) INTEGRATED CIRCUITS (ICS) (3DICS)

BACKGROUND

I. Field of the Disclosure

The technology of the disclosure relates generally to integrated circuits (ICs) and, more particularly, to placement of power gates in three-dimensional (3D) integrated circuits (ICs) (3DICs).

II. Background

Computing devices have become prevalent in modern society. While desktop computing remains widespread, recent years have seen an increase in the number of mobile computing devices. The increase in the number of mobile computing devices is driven in part by their relative affordability and the ever increasing functionality provided on such devices. While the increase in functionality has increased the versatility of the devices, the increase in versatility also increases the drain on the batteries used to power such mobile computing device. In an effort to extend battery life, various power-saving techniques have been implemented, such as putting elements in a sleep mode when such elements are not in use.

Even in sleep mode, some elements within an integrated circuit (IC) may continue to consume power because of stand-by or leakage current of transistors within the IC. One way to reduce such stand-by power consumption is through use of a power gating circuit or power gating cell. The power gating circuit is placed between a power source and one or more downstream logic elements. At its simplest, the power gating circuit is a switch that when turned on, allows power to flow to downstream logic elements, and when turned off, prevents power flowing to the downstream logic elements.

While power gating circuits may be effective at limiting power consumption within an IC, power gating circuits involve a variety of engineering tradeoffs. One such tradeoff is the area penalty imposed by the power gating circuit. An issue conjoined with the area penalty is how placement of the power gating circuit within the IC will impact routing of interconnections between other elements within the IC. Additionally, the power gating circuit has its own power leakage parameters. Accordingly, there need to be additional tools available to circuit designers to improve how power gating circuits are implemented in ICs.

SUMMARY OF THE DISCLOSURE

Aspects disclosed in the detailed description include power gate placement techniques in three-dimensional (3D) integrated circuits (ICs) (3DICs). In particular, exemplary aspects of the present disclosure contemplate consolidating power gating circuits or cells into a single tier within a 3DIC. Still further, in an exemplary aspect, the power gating circuits are consolidated in a tier closest to a voltage source. While it is possible to merely be near the voltage source, maximum benefit is achieved by being in the closest tier. This closest tier may include a backside metal layer that allows a distance between the voltage source and the power gating circuits to be minimized. By minimizing the distance between the voltage source and the power gating circuits, power loss from routing elements therebetween is minimized. Further, by consolidating the power gating circuits in a single tier, routing distances between the power gating circuits and downstream elements may be minimized and power loss from those routing elements are minimized. Other exemplary advantages are likewise realized by placement of the power gating circuits according to exemplary aspects of the present disclosure.

In this regard in one aspect, a monolithic 3DIC is disclosed. The monolithic 3DIC includes a first tier. The monolithic 3DIC also includes a second tier adjacent to the first tier in a face-to-face arrangement. The monolithic 3DIC also includes an inter-tier via providing electrical connections between the first tier and the second tier. The first tier includes a logic circuit and an absence of power gating circuits. The second tier includes a power gating circuit connected to the logic circuit through the inter-tier via. The power gating circuit is configured to provide power selectively to the logic circuit.

In another aspect, a monolithic 3DIC is disclosed. The monolithic 3DIC includes a first tier. The first tier includes a first face, a first back section, and a logic circuit. The monolithic 3DIC also includes a second tier. The second tier includes a second face, a second back section including a backside metal layer, and a power gating circuit. The second back section includes a plurality of metal layers. At least a portion of the backside metal layer comprises a voltage source bump interface and the power gating circuit is connected to the voltage source bump interface through the backside metal layer and no more than one metal layer of the plurality of metal layers. The first tier and the second tier are positioned such that the first face is connected to the second face.

In another aspect, a method of designing a monolithic 3DIC is disclosed. The method includes creating an initial circuit. The method also includes assigning one or more power gating circuits for the initial circuit to control power consumption in the initial circuit. The method also includes placing logic circuits of the initial circuit on a first tier of a 3DIC. The method also includes precluding placement of the one or more power gating circuits in the first tier of the 3DIC. The method also includes placing the one or more power gating circuits in a second tier of the 3DIC. The method also includes placing the first tier and the second tier in a face-to-face arrangement. The method also includes minimizing voltage drop between a voltage source and the one or more power gating circuits.

In another aspect, a monolithic 3DIC is disclosed. The monolithic 3DIC includes a first tier. The monolithic 3DIC also includes a second tier adjacent to the first tier in a face-to-face arrangement. The monolithic 3DIC also includes a means for providing electrical connections between the first tier and the second tier. The first tier includes a logic circuit and an absence of power gating circuits. The second tier includes a means for power gating connected to the logic circuit through an inter-tier via. The means for power gating is configured to provide power selectively to the logic circuit.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include power gate placement techniques in three-dimensional (3D) integrated circuits (ICs) (3DICs). In particular, exemplary aspects of the present disclosure contemplate consolidating power gating circuits or cells into a single tier within a 3DIC. Still further, in an exemplary aspect, the power gating circuits are consolidated in a tier closest to a voltage source. While it is possible to merely be near the voltage source, maximum benefit is achieved by being in the closest tier. This closest tier may include a backside metal layer that allows a distance between the voltage source and the power gating circuits to be minimized. By minimizing the distance between the voltage source and the power gating circuits, power loss from routing elements therebetween is minimized. Further, by consolidating the power gating circuits in a single tier, routing distances between the power gating circuits and downstream elements may be minimized and power loss from those routing elements are minimized. Other exemplary advantages are likewise realized by placement of the power gating circuits according to exemplary aspects of the present disclosure.

Figure 1:
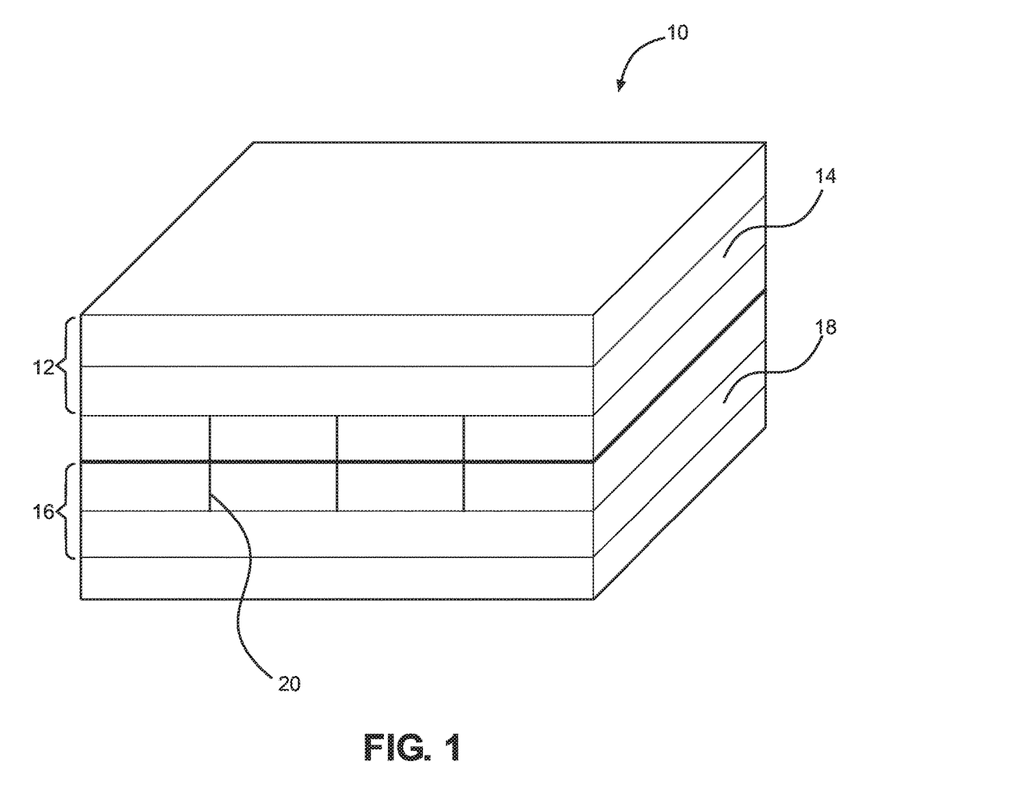
FIG. 1 is a simplified perspective view of an exemplary three-dimensional (3D) integrated circuit (IC) (3DIC) that may include consolidated power gating placed according to the present disclosure.

In this regard, FIG. 1 is a perspective view of an exemplary 3DIC 10 that may incorporate power gate cell placement techniques according to the present disclosure. Note that the term 3DIC may be amenable to multiple interpretations including separate dies stacked on top of one another and the like. However, as used herein, the term 3DIC is defined to be a monolithic 3DIC structure. The 3DIC 10 has a top tier 12 with a top active layer 14 in which elements are disposed. The 3DIC 10 has a bottom tier 16 different than the top tier 12 with a bottom active layer 18 in which elements are disposed. It should be appreciated that the relative terms "top" and "bottom" are not meant to be limiting and merely used for convenience. The elements within the top active layer 14 and the bottom active layer 18 are interconnected by monolithic inter-tier vias (MIVs) 20. As used herein, the MIVs 20 may sometimes be referred to as a means for providing electrical connections between tiers. For more information about MIVs, the interested reader is referred to "High-Density Integration of Functional Modules Using Monolithic 3D-IC Technology" by Shreepad Panth et al. in the proceedings of the IEEE/ACM Asia South Pacific Design Automation Conference, 2013; pp. 681-686, which is hereby incorporated by reference in its entirety. The 3DIC 10 may be formed through hydrogen cutting or similar technique. For more information on an exemplary hydrogen cutting process, the interested reader is referred to U.S. patent application Ser. No. 13/765,080, filed Feb. 12, 2013, which is herein incorporated by reference in its entirety. The '080 application further provides the interested reader a brief overview of the differences between a monolithic 3DIC and other forms of stacked integrated circuits.

In the 3DIC 10 in FIG. 1, there may be one or more power gating circuits that allow select logic and non-logic elements within the 3DIC 10 to be shut down to reduce power consumption. While the term "element" is used in the specification, it should be appreciated that such elements are, in many instances, formed from circuits and thus such elements may also be referred to as a circuit. In an exemplary aspect, the logic element may be a computational circuit, a digital process circuit, an analog process circuit, or a memory circuit. The non-logic elements may include other circuits. While the 3DIC 10 is presented as including exemplary aspects of the present disclosure, and in particular is assumed to have the power gating circuits consolidated into a single tier within the 3DIC 10 to provide power saving advantages and placement and routing advantages, in the interests of helping illustrate advantages of the present disclosure, a brief illustration of a conventional power gate cell placement is provided with reference to FIG. 2.

Figure 2:
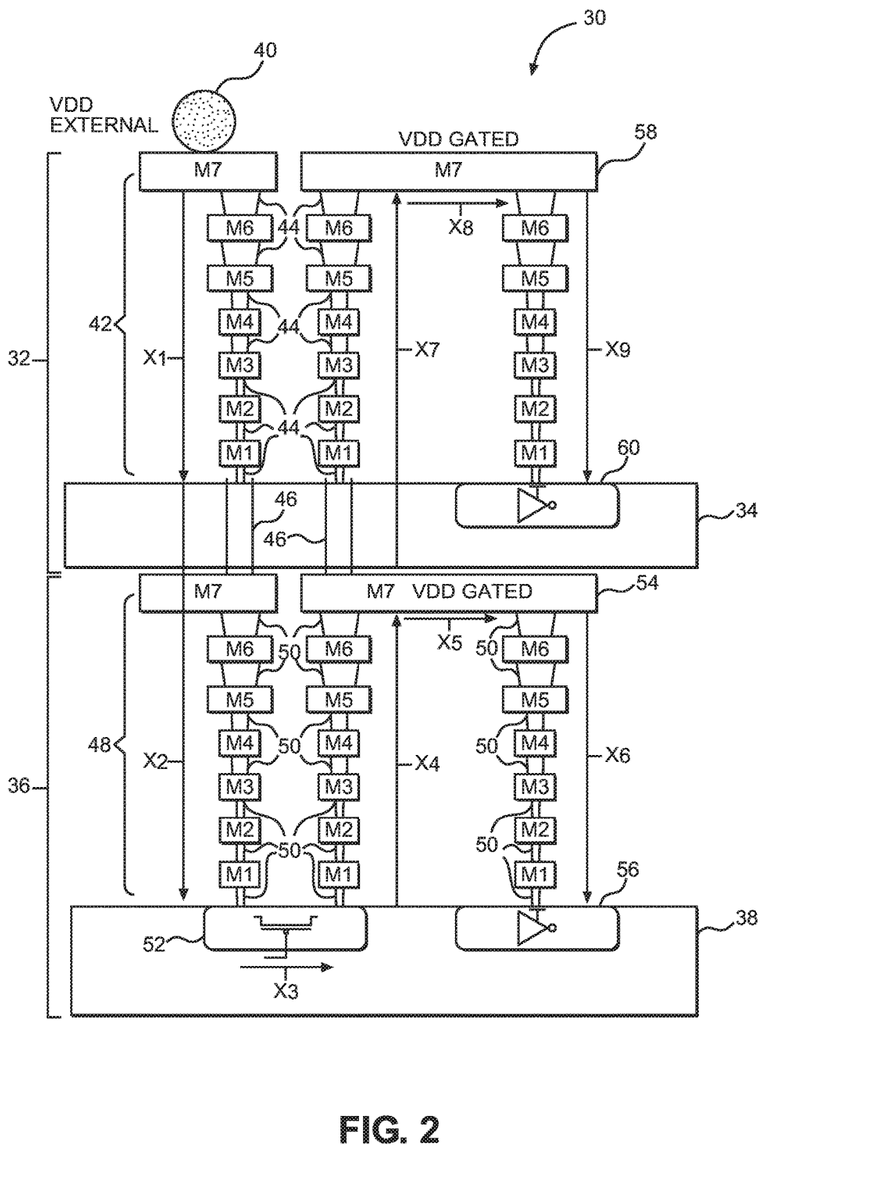
FIG. 2 is a side elevational view of a conventional placement of a power gating circuit in a 3DIC.

In this regard, FIG. 2 is a side elevational view of a conventional placement of a power gating circuit in a 3DIC 30. The 3DIC 30 includes a top tier 32 with a top active layer 34 and a bottom tier 36 different than the top tier 32 with a bottom active layer 38. The top tier 32 may include a voltage source interface 40, which may be an IC bump, pin, or other element that allows an external voltage source ($VDD_{external}$) to be provided to the 3DIC 30. The top tier 32 further includes a plurality of metal layers 42 (denoted M1-M7 in FIG. 2). The voltage source interface 40 may be connected to a metal layer M7 of the plurality of metal layers 42. The plurality of metal layers 42 may be interconnected by vias 44 and may further be connected to the bottom tier 36 through inter-tier vias 46. The inter-tier vias 46 may also sometimes be referred to as a means for providing electrical connections between tiers. Similarly, the bottom tier 36 may include a plurality of metal layers 48 (also denoted M1-M7 in FIG. 2). The plurality of metal layers 48 may be interconnected by vias 50.

With continued reference to FIG. 2, the external voltage source is applied to the voltage source interface 40 and is conveyed to a power gating circuit 52 in the bottom tier 36. As used herein, a power gating circuit such as the power gating circuit 52 may sometimes be referred to as a means for power gating. Between the voltage source interface 40 and the power gating circuit 52, voltage experiences power loss from resistance of the vias 44 (distance noted $X_1$), the inter-tier vias 46, and the vias 50 ($X_2$). A further voltage drop may be experienced passing through the power gating circuit 52 ($X_3$). An additional voltage drop may be experienced passing from the power gating circuit 52 back to top metal layer 54 (M7) of the bottom tier 36 ($X_4$), at which point the voltage is no longer equal to the original external voltage (i.e., $VDD_{external}$), but may be considered a first gated voltage (e.g., $VDD_{gated}$). The first gated voltage may be available to logic element 56 in the bottom tier 36 by passing across the metal layer M7 ($X_5$) and back through the plurality of metal layers 48 and the vias 50 ($X_6$). It should be appreciated that the sum of the resistances associated with $X_1$ to $X_6$ results in power loss before the voltage is provided to the logic element 56. The first gated voltage may further be provided back to the top tier 32 through the inter-tier vias 46 and back to top metal layer (M7) 58 (of the top tier 32 through the vias 44) ($X_7$). The additional path causes a further voltage drop, at which point the voltage is now a second gated voltage (e.g., $VDD_{gated2}$). The second gated voltage is available to a logic element 60 in the top tier 32 by passing across the metal layer M7 ($X_8$) through additional vias 44 ($X_9$). It should be appreciated that the sum of the resistances associated with $X_1$ to $X_4$ and $X_7$ to $X_9$ may result in power loss before the voltage is provided to the logic element 60.

With continued reference to FIG. 2, if there are more tiers (not illustrated) in the 3DIC 30, the voltage drop before the gated voltage reaches a final logic element may be even greater. Still further, not every tier in a 3DIC may be able to have a gated voltage on the corresponding top metal layer and may have to rely on a gated voltage from a different tier with a corresponding longer path and greater voltage drop. The greater the voltage drop before the logic element, the higher the external voltage must be to ensure proper performance of the logic elements or logic circuits. Higher external voltages generally shorten battery life and may necessitate having multiple voltage rails, which increases design complexity and may impose an area penalty. In short, there needs to be a way to shorten the path from the external voltage interface to the logic element while still providing a power gating circuit.

Figure 3:
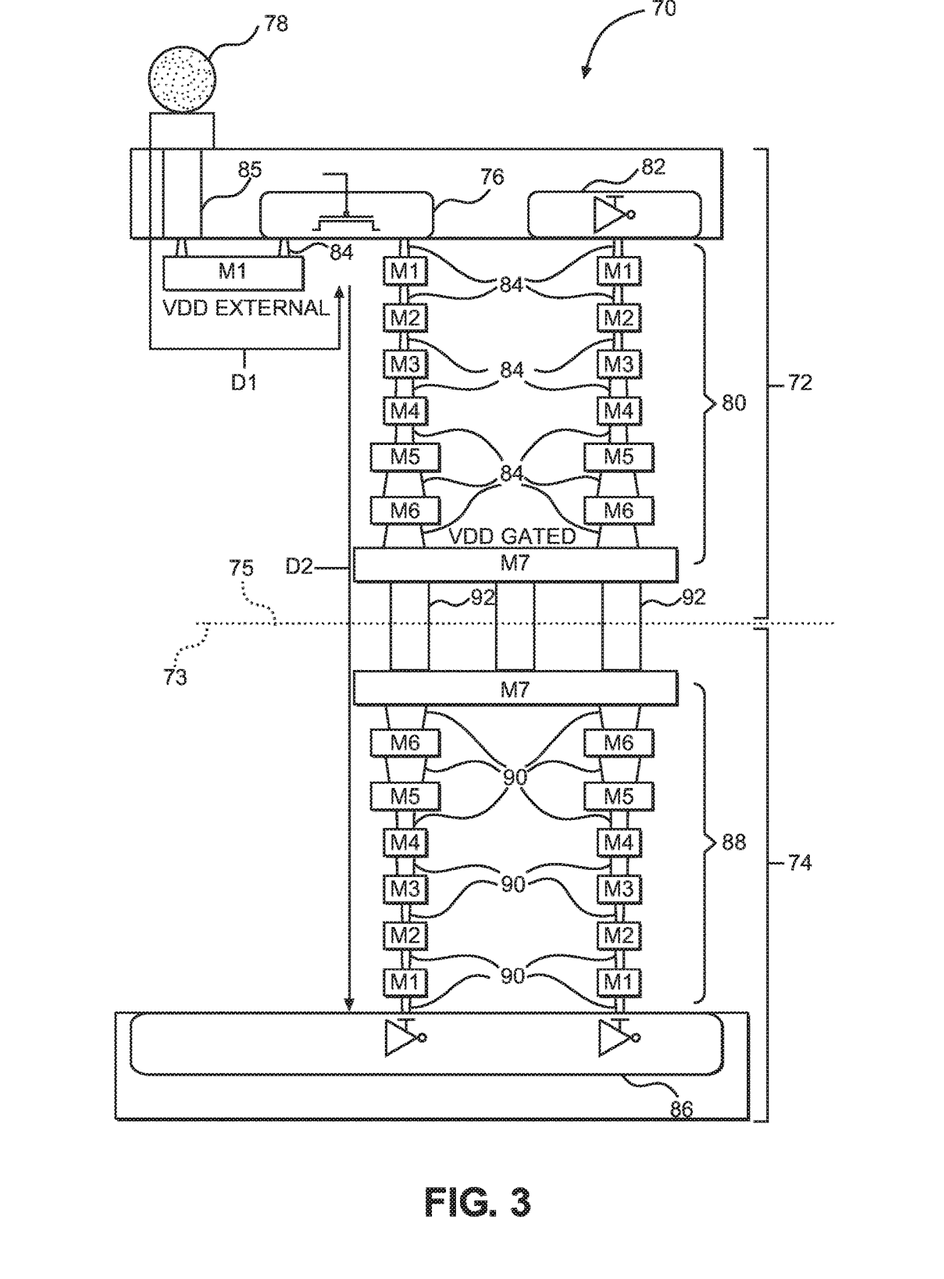
FIG. 3 is a side elevational view of an exemplary power gating circuit placement including power gating circuits consolidated into a single tier of a 3DIC.

In this regard, FIG. 3 is a side elevational view of an exemplary power gating circuit placement including power gating circuits consolidated into a single tier of a 3DIC, according to exemplary aspects of the present disclosure. In particular, FIG. 3 illustrates a 3DIC 70. The 3DIC 70 may include a top tier 72 and a bottom tier 74. The top tier 72 and the bottom tier 74 are arranged in a face-to-face arrangement. As used herein, face-to-face is defined to be metal layers-to-metal layers. That is, a face 73 of the top tier 72 is adjacent a face 75 of the bottom tier 74. Face-to-face is specifically contrasted with face-to-back, where the metal layers of one tier are adjacent the active element layer of a second tier (the 3DIC 30 of FIG. 2 is a face-to-back arrangement). The top tier 72 includes one or more power gating circuits such as power gating circuit 76 (only one shown) and may include a voltage source interface 78 to which an external voltage source ($VDD_{external}$) may be applied. The top tier 72 may further include a plurality of metal layers 80 and one or more logic elements 82. Note that while the 3DIC 70 is illustrated as having the one or more logic elements 82 in the top tier 72, exemplary aspects of the present disclosure do not require that logic elements be present in the top tier 72. The plurality of metal layers 80 are interconnected by vias 84. The power gating circuit 76 is connected to the voltage source interface 78 through only one metal layer (M1) of the plurality of metal layers 80, the vias 84, and through a through silicon via (TSV) 85 (distance D1). Thus, the distance D1 from the voltage source interface 78 to the power gating circuit 76 is short compared to the paths illustrated in FIG. 2 for the 3DIC 30 (e.g., $X_1$ to $X_5$).

With continued reference to FIG. 3, the bottom tier 74 may include one or more logic elements 86 (sometimes also referred to as logic circuit) and a plurality of metal layers 88. The plurality of metal layers 88 may be interconnected by vias 90. The top tier 72 may be connected to the bottom tier 74 by monolithic inter-tier vias 92. In an exemplary aspect, there is an absence of power gating circuits in the bottom tier 74.

Exemplary aspects of the present disclosure consolidate all power gating circuits, including the power gating circuit 76, into a single tier, namely the top tier 72, closest to the voltage source interface 78 of the 3DIC 70. That is, in this example, no other tier would include power gating circuits. By consolidating the power gating circuits, including the power gating circuit 76, into the top tier 72 in the 3DIC 70 in this example, the voltage drop from the voltage source interface 78 to the power gating circuit 76 is minimized since the distance D1 from the voltage source interface 78 to the power gating circuit 76 is relatively short (especially as compared to the multiple tiers and vias that may exist in conventional layouts such as the 3DIC 30 of FIG. 2). Still further, the path length from the power gating circuit 76 to the one or more logic elements 82 or the one or more logic elements 86 (D2) is relatively short. By reducing the path lengths D1 and D2, the voltage drop to the logic element is reduced and $VDD_{external}$ may be reduced.

Further, different technologies may be used for different tiers resulting in manufacturing benefits. This difference may be summarized as having technology nodes of the different tiers be heterogeneous relative to one another. In an exemplary aspect, the technology nodes may employ a finer scale. For example, the top tier 72 may be made using a twenty-eight (28) nanometer (nm) scale technology. In contrast, the bottom tier 74 may be made using a ten (10) nm scale technology (e.g., smaller scale is a finer scale). Current manufacturing processes for the twenty-eight (28) nm scale technology are generally less expensive than the ten (10) nm technology, and thus, cost savings for that tier could be effectuated. Further, power gating circuits in general are harder to manufacture at a ten (10) nm technology scale, so by relaxing the technology requirement for the power gating circuit, cost savings may be effectuated. While scale is one type of technology node difference, it should be appreciated that other technology differences such as transistor flavor (PMOS or NMOS), level of doping, type of substrate material, and/or the like may also be used to provide engineering or manufacturing advantages. Still further, by removing the relatively large power gating circuits from other tiers, it may be easier to perform placement and routing of logic elements in the tiers without power gating circuits. While benefits may be effectuated by having heterogeneous technology nodes, it should be appreciated that the technology nodes across the tiers may be homogeneous without departing from the scope of the present disclosure.

While it is possible to include power gating circuits in other tiers of the 3DIC 70, such a placement spread may increase the voltage drop experienced before the power gating circuits and may further complicate shifting technology types (e.g., 28 nm to 10 nm) based on tier. Thus, the greater the concentration or consolidation of power gating circuits into a single tier, the greater the benefit. Likewise, while it is possible to consolidate the power gating circuits into tiers other than the tier closest to the voltage source interface 78, adding tiers between the voltage source interface 78 and the power gating circuits adds resistive losses before the power gating circuits and accordingly may require a higher voltage source.

Figure 4:
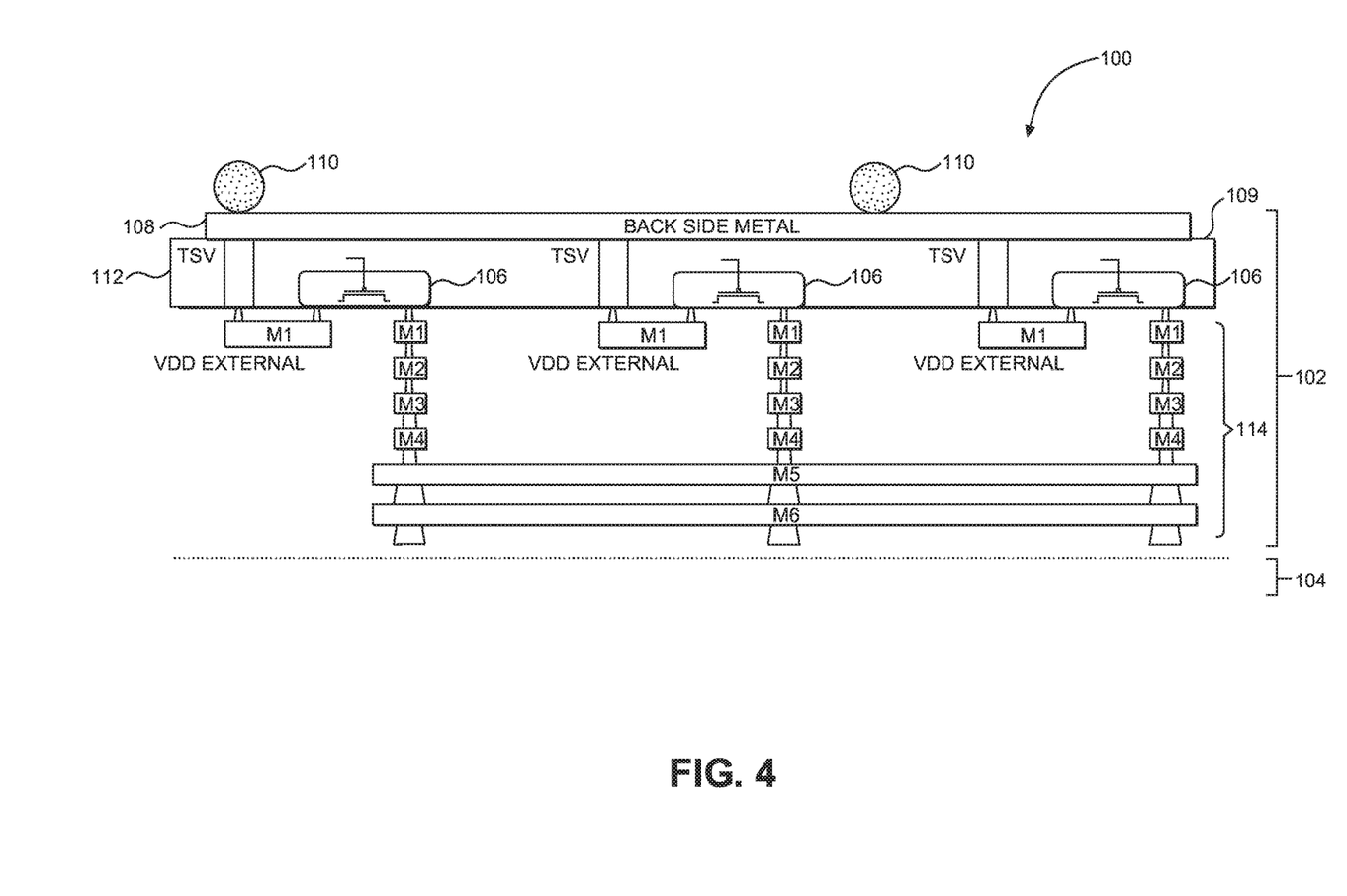
FIG. 4 is a partial side elevational view of an exemplary power gating circuit placement with an additional backplane to facilitate better distribution of a voltage source to the power gating circuits.

FIG. 4 is a partial side elevational view of an exemplary power gating circuit placement with an additional backside metal layer to facilitate better distribution of a voltage source to the power gating circuits. In particular, FIG. 4 illustrates a 3DIC 100 having a top tier 102 and a bottom tier 104 (only partially illustrated). To assist in uniform distribution of the external voltage source to each power gating circuit 106, the top tier 102 includes a backside metal layer 108 positioned on an outer surface 109 between the voltage source interface 110 and the substrate 112. The top tier 102 further includes a plurality of metal layers 114. By adding the backside metal layer 108, more space is preserved in the plurality of metal layers 114 for interconnection routing while preserving the advantages of the 3DIC 70 of FIG. 3.

Note that while FIGS. 3 and 4 contemplate the power gating circuits being a power header gating scenario where the power gating circuits are proximate the external voltage source Vdd, it should appreciated that instead of Vdd, the power gating circuit could be a power footing gating scenario where the power gating circuit is connected to ground or a different external voltage source, namely Vss. In the event that the power gating circuit is a power header gating scenario, the power gating circuit may be based on a PMOS technology. If the power gating circuit is a power footer gating scenario, the power gating circuit may be based on an NMOS technology.

Figure 5A:
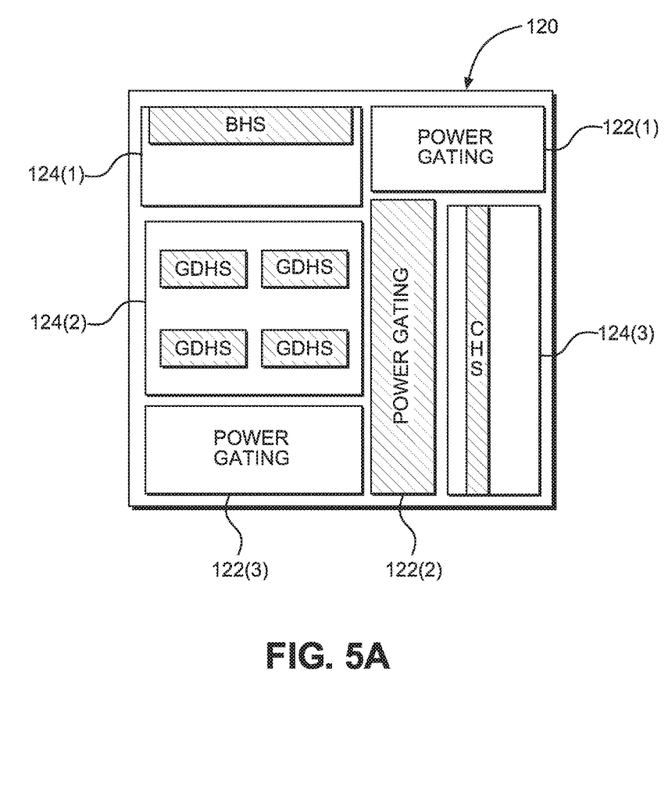
FIG. 5A illustrates a simplified plan view of a conventional tier in a 3DIC having power gating circuits mixed with logic cells.
Figure 5B:
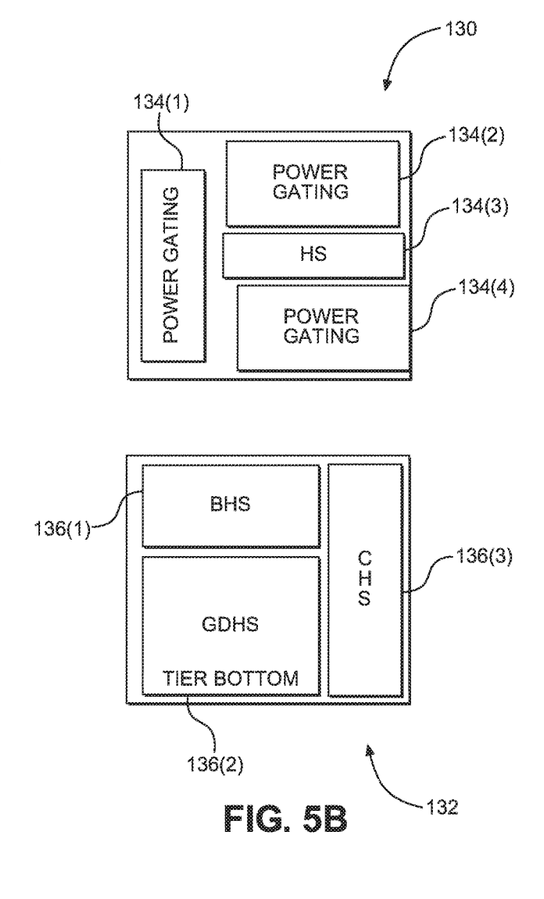
FIG. 5B illustrates a simplified plan view of a tier in a 3DIC having power gating circuits placed according to exemplary aspects of the present disclosure.

As noted above, exemplary aspects of the present disclosure provide advantages for power gating circuit placement and potentially for consolidating technology types. In this regard, FIG. 5A illustrates a simplified plan view of a conventional tier 120 having power gating circuits 122(1)-122(3) mixed with logic elements 124(1)-124(3). To the extent that the logic elements 124(1)-124(3) may need to be manufactured according to a ten nanometer technology, the power gating circuits 122(1)-122(3) are likewise manufactured according to the ten nanometer technology. Typically, power gating circuits do not need such small technology factors, and thus, the power gating circuits are effectively over-engineered and add unnecessary expense to the tier. In contrast, FIG. 5B illustrates a simplified plan view of a top tier 130 and a bottom tier 132 having power gating circuits 134(1)-134(4) placed in the top tier 130 and logic elements 136(1)-136(3) placed in the bottom tier 132. The top tier 130 may be made using a less expensive technology scale (e.g., twenty-eight nanometers), a different material, or have other differences in technology.

Figure 6:
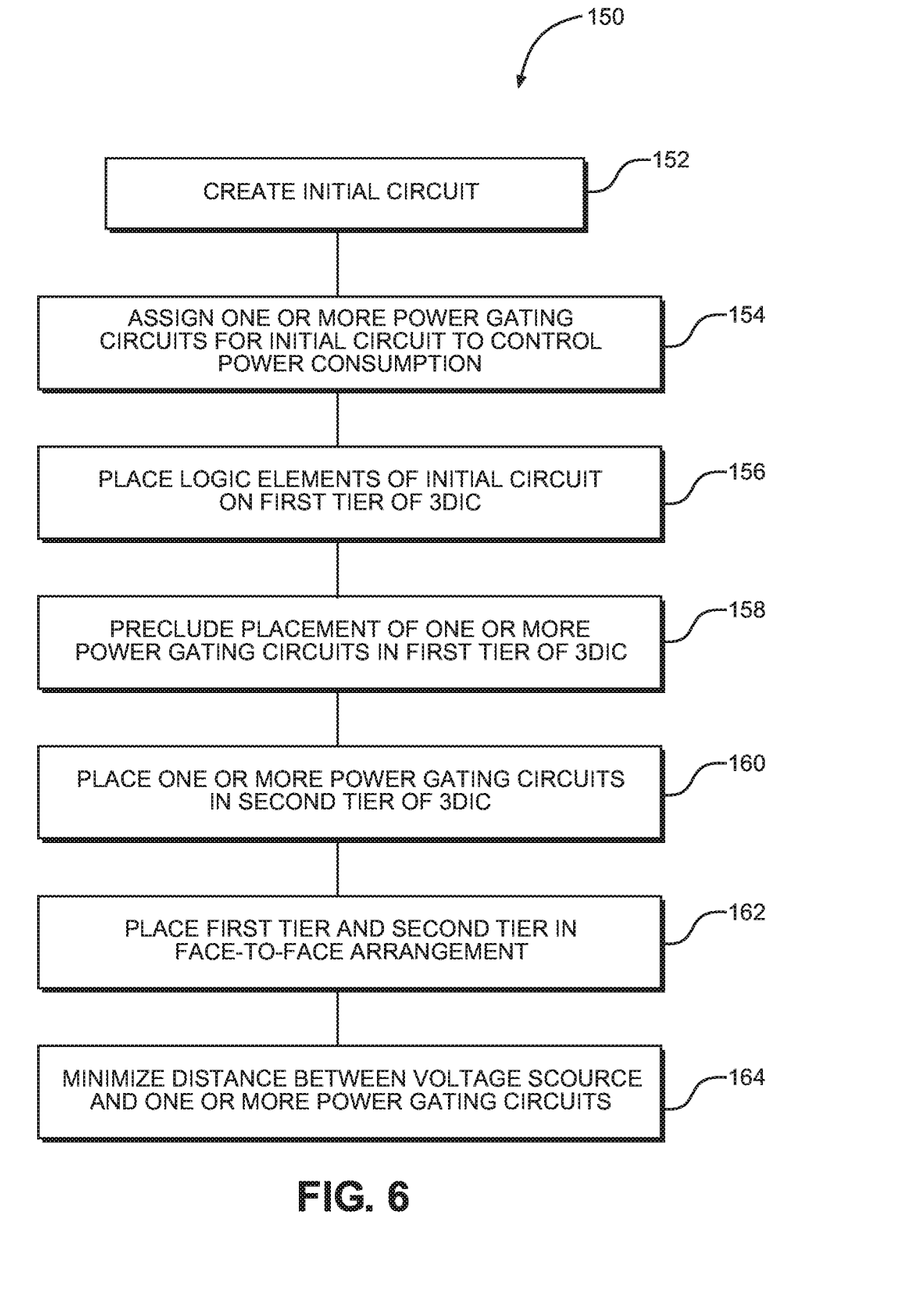
FIG. 6 is a flowchart illustrating an exemplary power gating circuit placement process according to an exemplary aspect of the present disclosure.

FIG. 6 is a flowchart illustrating a power gating circuit placement process 150 according to an exemplary aspect of the present disclosure. The process 150 begins by creating an initial circuit (block 152). This initial circuit may be dictated by the functionality desired and/or appropriate protocol or standard requirements. Creating the initial circuit may include determining which logic elements are needed and how to manage a clock tree as well as other requirements as is well understood. After creation of the initial circuit, the designer assigns one or more power gating circuits for the initial circuit to control power consumption in the initial circuit (block 154). The designer then places logic elements of the initial circuit on a first tier of a 3DIC (e.g., the 3DIC 10, 30 or 100) (block 156). As noted above, maximum benefit is achieved by precluding placement of the one or more power gating circuits in the first tier of the 3DIC (e.g., the 3DIC 10, 30, or 100) (block 158), although consolidation of a majority of power gating circuits provides some benefit and is not excluded from exemplary aspects of the present disclosure. The designer then places the one or more power gating circuits in a second tier of the 3DIC (e.g., the 3DIC 10, 30, or 100) (block 160). The first tier and the second tier are placed into a face-to-face arrangement (block 162). Using appropriate vias and metal layers, the distance between voltage source and the one or more power gating circuits is minimized (block 164).

The consolidated power gate placement techniques in 3DICs may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, a server, and an automobile.

Figure 7:
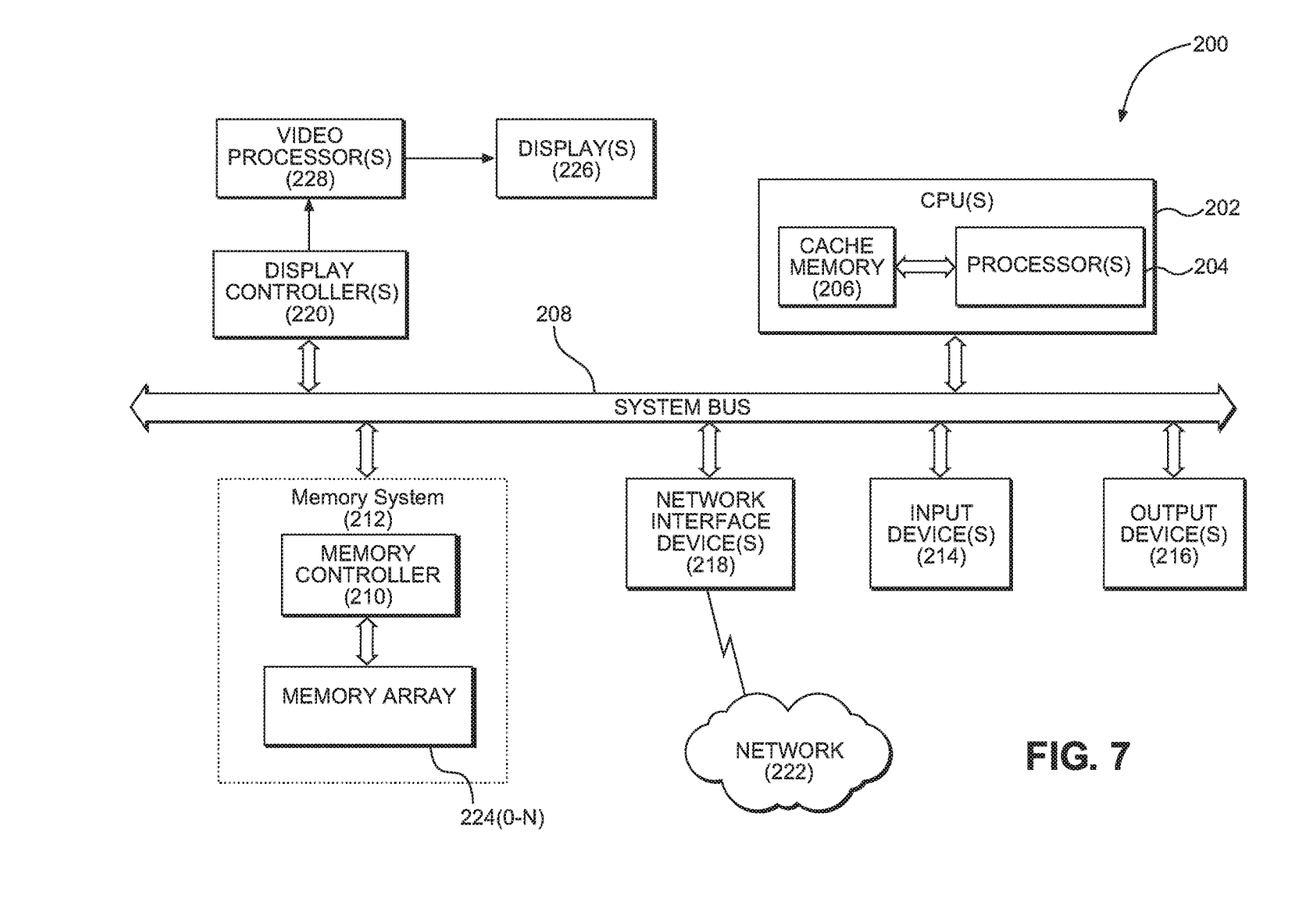
FIG. 7 is a block diagram of an exemplary processor-based system that can include a 3DIC with power gating circuit placement, according to any of exemplary aspects disclosed herein.

In this regard, FIG. 7 illustrates an example of a processor-based system 200 that can employ a 3DIC having consolidated power gating circuits for improved power performance and manufacturing improvements. For example, the 3DIC having the consolidated power gating circuits may be the 3DIC 10 of FIG. 1, the 3DIC of FIG. 2, the 3DIC 70 of FIG. 3, or the 3DIC 100 of FIG. 4 as non-limiting examples. In this example, the processor-based system 200 includes one or more central processing units (CPUs) 202, each including one or more processors 204. The CPU(s) 202 may be the 3DIC 10, 30, 70, or 100. The CPU(s) 202 may have cache memory 206 coupled to the processor(s) 204 for rapid access to temporarily stored data. The CPU(s) 202 is coupled to a system bus 208 and can intercouple master and slave devices included in the processor-based system 200. As is well known, the CPU(s) 202 communicates with these other devices by exchanging address, control, and data information over the system bus 208. For example, the CPU(s) 202 can communicate bus transaction requests to a memory controller 210 as an example of a slave device. Although not illustrated in FIG. 7, multiple system buses 208 could be provided, wherein each system bus 208 constitutes a different fabric.

Other master and slave devices can be connected to the system bus 208. As illustrated in FIG. 7, these devices can include a memory system 212, one or more input devices 214, one or more output devices 216, one or more network interface devices 218, and one or more display controllers 220, as examples. The input device(s) 214 can include any type of input device, including, but not limited to, input keys, switches, voice processors, etc. The output device(s) 216 can include any type of output device, including, but not limited to, audio, video, other visual indicators, etc. The network interface device(s) 218 can be any device configured to allow exchange of data to and from a network 222. The network 222 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 218 can be configured to support any type of communications protocol desired. The memory system 212 can include one or more memory units 224(0-N).

The CPU(s) 202 may also be configured to access the display controller(s) 220 over the system bus 208 to control information sent to one or more displays 226. The display controller(s) 220 sends information to the display(s) 226 to be displayed via one or more video processors 228, which process the information to be displayed into a format suitable for the display(s) 226. The display(s) 226 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A monolithic three-dimensional (3D) integrated circuit (IC) (3DIC) comprising:
    a first tier;
    a second tier adjacent to the first tier in a face-to-face arrangement; and
    an inter-tier via providing electrical connections between the first tier and the second tier;
    the first tier comprising a logic circuit and an absence of power gating circuits; and
    the second tier comprising a power gating circuit connected to the logic circuit through the inter-tier via, wherein the power gating circuit is configured to provide power selectively to the logic circuit.

2. The monolithic 3DIC of claim 1, wherein the logic circuit comprises one of a computational circuit, an analog process circuit, a digital process circuit, and a memory circuit.

3. The monolithic 3DIC of claim 1, wherein the second tier further comprises a voltage source interface, wherein the voltage source interface is electrically connected to the power gating circuit.

4. The monolithic 3DIC of claim 1, wherein technology nodes of the first tier are heterogeneous relative to technology nodes of the second tier.

5. The monolithic 3DIC of claim 1, wherein technology nodes of the first tier and technology nodes of the second tier are homogeneous.

6. The monolithic 3DIC of claim 1, wherein the second tier comprises a plurality of metal layers proximate a face of the second tier and a backside metal layer proximate an outer surface of the 3DIC and wherein the backside metal layer comprises a voltage source bump interface.

7. The monolithic 3DIC of claim 6, wherein the backside metal layer couples to the power gating circuit using no more than one metal layer of the plurality of metal layers in the second tier.

8. The monolithic 3DIC of claim 3, wherein the voltage source interface comprises an external voltage source interface.

9. The monolithic 3DIC of claim 8, wherein the power gating circuit comprises a PMOS-based element.

10. The monolithic 3DIC of claim 3, wherein the voltage source interface comprises a ground node interface.

11. The monolithic 3DIC of claim 10, wherein the power gating circuit comprises an NMOS-based element.

12. The monolithic 3DIC of claim 1, wherein the first tier comprises at least one non-logic circuit.

13. The monolithic 3DIC of claim 1 integrated into a device selected from the group consisting of: a set top box; an entertainment unit; a navigation device; a communications device; a fixed location data unit; a mobile location data unit; a mobile phone; a cellular phone; a smart phone;

a tablet; a phablet; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

14. A monolithic three-dimensional (3D) integrated circuit (IC) (3DIC) comprising:
   a first tier;
   a second tier adjacent to the first tier in a face-to-face arrangement; and
   a means for providing electrical connections between the first tier and the second tier;
   the first tier comprising a logic circuit and an absence of power gating circuits; and
   the second tier comprising a means for power gating connected to the logic circuit through an inter-tier via, wherein the means for power gating is configured to provide power selectively to the logic circuit.

15. The monolithic 3DIC of claim 3, wherein the second tier further comprises a plurality of metal layers.

16. The monolithic 3DIC of claim 15, wherein the power gating circuit is connected to the voltage source interface through only one metal layer of the plurality of metal layers.

\* \* \* \* \*